United States Patent [19]
Berry et al.

[11] Patent Number: 5,449,506
[45] Date of Patent: Sep. 12, 1995

[54] PROCESS FOR PRODUCING POTASSIUM CARBONATE

[75] Inventors: William W. Berry; Thomas E. Baroody; James M. Crawford, all of Lakeland, Fla.

[73] Assignee: K-Technologies, Inc., Mulberry, Fla.

[21] Appl. No.: 271,367

[22] Filed: Jul. 6, 1994

Related U.S. Application Data

[63] Continuation-in-part of Ser. No. 78,475, Jun. 16, 1993, abandoned.

[51] Int. Cl.[6] .............................................. C01D 7/00
[52] U.S. Cl. ........................... 423/421; 23/302 R; 210/681; 423/357; 423/420; 423/422; 423/424; 423/497
[58] Field of Search ............... 423/421, 422, 424, 497, 423/420, 357; 23/302 A, 302 R; 210/681

[56] References Cited

U.S. PATENT DOCUMENTS

| | | | |
|---|---|---|---|
| 1,215,575 | 2/1917 | Pennock et al. | 423/424 |
| 2,989,370 | 6/1961 | Lee et al. | 423/424 |
| 3,792,153 | 2/1974 | Lynn et al. | 423/421 |

FOREIGN PATENT DOCUMENTS

| | | | |
|---|---|---|---|
| 742730 | 5/1970 | Belgium | 423/421 |
| 2118 | 9/1955 | United Kingdom | 423/420 |

*Primary Examiner*—Wayne Langel
*Attorney, Agent, or Firm*—James H. Beusse

[57] ABSTRACT

A method for producing potassium carbonate using a continuous countercurrent exchange system. A continuous ion exchange system with resin in the ammonium form is flushed with a saturated potassium chloride solution which displaces the ammonium ion and replaces it with potassium. Ammonium carbonate is then passed through the ion exchanger to place the ammonium in the reserve form, by displacing the potassium, and produce a concentrated potassium carbonate solution. This process is done in a continuous countercurrent manner which allows maximum recovery of the potassium carbonate as a 15-18% by weight solution with minimum impurities, and at high throughput rates. The potassium carbonate solution is then removed, evaporated, dried, sized and stored for subsequent shipment. The ammonium chloride from the ion exchanger is treated with slaked lime to produce ammonium hydroxide, which in turn is reacted with carbon dioxide (from calcined limestone or an outside source) to regenerate ammonium carbonate for reuse in the ion exchanger. Calcium chloride is a co-product of the overall reaction.

9 Claims, 15 Drawing Sheets

| FIG. 5A | FIG. 5D | FIG. 5G | FIG. 5J |
| FIG. 5B | FIG. 5E | FIG. 5H | FIG. 5K |
| FIG. 5C | FIG. 5F | FIG. 5I | FIG. 5L |

PROCESS FOR PRODUCING POTASSIUM CARBONATE

This application is a continuation-in-part of application, Ser. No. 08/078,475, filed Jun. 16, 1993, abandoned.

BACKGROUND OF THE INVENTION

This invention relates to a process for producing alkaline carbonates and more specifically, relates to a process for production of potassium carbonate directly from potassium chloride using a continuous countercurrent cation exchange system. Examples of known commercial techniques for producing potassium carbonate first involve the production of potassium hydroxide. Potassium hydroxide is typically produced using electrolysis of a potassium chloride brine solution. Once potassium hydroxide is produced, it is reacted with a combustion material that generates $CO_2$ when burned, such as natural gas. During the reaction of potassium hydroxide with $CO_2$, solid potassium carbonate is produced. Commercial liquid solutions of potassium carbonate may be produced either by dissolving the solids made as above in water, or by introducing carbon dioxide gas into potassium hydroxide made as above.

A drawback to this prior technique is that production of potassium hydroxide requires a large amount of electricity and is energy intensive. Thus, the preparation of the potassium hydroxide is an expensive portion of the procedure. The present invention eliminates the need to first produce potassium hydroxide, thereby eliminating an expensive process step in the current manufacturing scheme.

The present invention also makes substantial technical and economical improvements over earlier cation ion exchange methods described to make potassium carbonate from potassium chloride that are the subject of prior patents, such as U.S. Pat. No. 2,767,057 and Belgium Patent No. 742730. It is not believed that the process to produce potassium carbonate as described in those patents has ever been commercialized, due to inherent limitations on product purity and ion exchange effluent potassium carbonate concentrations which render the previous approaches uneconomic.

SUMMARY OF THE INVENTION

The present invention discloses a method for producing potassium carbonate using a continuous countercurrent cation exchange system where a salt split is achieved with concentrated solutions of potassium chloride (KCl) and ammonium carbonate $(NH_4)_2CO_3$. The continuous countercurrent exchange system salt split results in the formation of a relatively high concentration of potassium carbonate solution and a by-product ammonium chloride solution. The potassium carbonate solution is then steam stripped to remove residual ammonium carbonate which is recovered, and then evaporated to produce a concentrated potassium carbonate solution. This solution is then typically subject to drying to form an anhydrous granulated material, which is sized and stored for subsequent use.

A liquid material containing 47% potassium carbonate by weight can also be produced by blending weak and concentrated potassium carbonate solutions.

The ammonium chloride solution, resulting from the ion exchange operation, is mixed with a lime slurry for conversion to calcium chloride and ammonium hydroxide. This solution is then clarified and steam stripped to recover the ammonia which is recycled back into the process. The resulting calcium chloride solution is monitored then discharged or transferred to conventional $CaCl_2$ processing techniques.

Potassium chloride solution may be prepared via dissolution of dry potassium chloride and water. Ammonium carbonate solution may be prepared from a solution of ammonium hydroxide and $CO_2$ gas.

In comparison with previous patented processes for producing potassium carbonate from potassium chloride via ion exchange, the present invention provides for more efficient and economical production of $K_2CO_3$ as a result of utilizing a continuous countercurrent cation ion exchange system versus the use of a batch-type, fixed-bed cation ion exchange system. This allows several increments of the utilized resin to contact the starting compounds, which among other advantages, permits: (1) greater production throughput as a result of higher resin loading; (2) lower chloride contamination in the $K_2CO_3$ product; and (3) much higher concentration of potassium carbonate exiting the ion exchange system.

In a first option, the potassium carbonate effluent from the ion exchange system may be mixed with an alcohol such as ethyl alcohol, whereby $K_2CO_3$ is rejected from the solution, as a solid crystal. The slurry is filtered to remove the $K_2CO_3$ solids, which can then be redissolved for use as an intermediate, or dried for use as a solid product. The alcohol/water phase is distilled, for alcohol recovery/recycle and water recovery/recycle.

In a second option, the potassium carbonate effluent is further carbonated to the bicarbonate form then mixed with dry potassium chloride material. The potassium bicarbonate then precipitates and is fed to cake drying or other processing operations. The potassium chloride solution is then reinjected back into the ion exchange process.

The operation of the regeneration zone is such that a number of increments of resin are contacted (in the countercurrent fashion) so that the regenerated resin exiting the regeneration zone is fully converted to the K+ form. Further, since the resin is loaded to the maximum extent possible with potassium it is not essential to maintain any sort of profile with the K-loaded resin, i.e. the resin can be mixed and disturbed without affecting subsequent production performance. It is apparent that in the earlier processes the potassium-loaded ion exchange bed could not be disturbed since it is essential that the high K-loaded resin be at the top of the bed and lower concentration K-loaded resin be at the bottom. By use of the improved, countercurrent approach, a high level of potassium chloride efficiency is achieved while simultaneously allowing for the conversion of the resin to its maximum K+ loading capacity. The amount of KCl used in the improved approach, in terms of grams KCl per liter of resin treated, is typically 120 to 140 grams KCl per liter of resin. This allows for a much higher loading capacity onto the resin which translates into improved performance, solution concentrations, and improved throughput throughout the rest of the system.

It has been found that with the "conventional" methods, or levels, of water washing, the ion exchange resin system would not allow for the production of potassium carbonate which meets the current, stringent specification for chloride contamination. It has been discovered that an aggressive, upflow fluidization is essential to achieve effective and complete KCl entrainment removal. This would be impossible in the fixed bed process referred to in previous patents (U.S. Pat. No. 2,767,051 and Belgium 742730), since an aggressive, upflow water fluidization would disturb the resin bed; thus destroying the potassium profile which is essential to effective operation using the preferred approach. Chloride levels of less than 20-30 ppm of Cl_ on an anhydrous $K_2CO_3$ basis have been achieved in laboratory and pilot plant test work.

It is well known that the degree of ammonium ion ($NH_4+$) in solutions, such as carbonate, is highly dependent on the pH of the media. The lower the pH, the higher the degree of bicarbonate, and the more ammonium ion present. As the pH increases, the shift is in the opposite direction and a higher degree of free ammonia will be contained in the liquid. It is desirable to have a higher degree of ammonium in the ion exchange feed solution. However, with the carbonate system, as the pH is lowered (i.e. a shift towards more ammonium) the solubility of the resulting ammonium bicarbonate/carbonate salt decreases. This lowers the extent of total nitrogen (ammonia and ammonium) in the solution. Further, this lower concentration can have a negative effect on the resulting concentration of potassium carbonate in the ion exchange exit product solution; thus, a compromise is necessary. In U.S. Pat. No. 2,767,051, an ammonia/$CO_2$ mole ratio range is established which apparently allows for operation of this circuit. In the invention the use of continuous, countercurrent ion exchange allows for the use of virtually any ammonia to $CO_2$ ratio, up to and including ammonium carbonate. Typically, the ratio of ammonia to $CO_2$ in the invention could be greater than 0.65 ($NH_3/\frac{1}{2}CO_2$) and up to a stoichiometric ammonium carbonate molar ratio ($NH_3/0.5CO_2$ of 1). This limitation, i.e. ammonia/$CO_2$ ratio is eliminated in the invention. Further, by having this latitude, the higher pH ammonium carbonate is considerably more soluble than the bicarbonate or lower pH solution; thus, while the extent of ammonia may be higher at ratios above 0.65 the absolute amount of ammonium is also improved, thus the driving force for ion exchange reaction is maintained at a high level. The potassium carbonate solution resulting from the production zone of the invention (continuous countercurrent) will contain potassium carbonate plus excess ammonia/$CO_2$, since a driving force is required. An improved feature brought about by this approach is that the concentration of potassium carbonate in the ion exchange product solution is significantly higher than that achieved in earlier techniques. Potassium carbonate concentrations 150 to 180 grams per liter have been achieved, which is more than double that which was obtained using previous non-continuous ion exchange processes (e.g. about 70 grams per liter $K_2CO_3$ was achieved in U.S. Pat. No. 2,767,051). The higher potassium carbonate concentration achieved in the invention results in less subsequent water evaporation requirements, thereby improving process economics. The ion exchange resin exiting in the production zone is essentially in the ammonium form. It is water washed (to a lesser degree since a slight amount of ammonia and $CO_2$ can be tolerated in the regeneration side) then transferred to the regeneration zone for countercurrent contacting with the KCl solution.

A packed column steam stripper is utilized whereby the $K_2CO_3$ solution enters the top of the column and flows downwards (countercurrent) against an uprising flow of steam. The solution falls to the bottom of column into a reboiler, which is indirectly heated (typically with steam), and brought to a boil so as to generate the rising column of steam from the product solution itself. It has been discovered that operation of the stripper circuit in this fashion will allow for minimum evaporation of the potassium carbonate solution; thus, minimizing the overall steam consumption for this step. Recovery of ammonium carbonate is in excess of 99.9%.

Although Lynn et.al. (U.S. Pat. No. 3,792,153) described a process to produce ammonia and water from an $NH_4Cl$ solution by reacting it with magnesium oxide, an alkaline earth metal oxide similar to calcium oxide, according to the formula:

$$MgO + 2NH_4Cl \rightarrow MgCl_2 + 2NH_3 + H_2O$$

there are important differences between Lynn et.al. and those incorporated in the embodiment above.

Firstly, it was the intent of Lynn et.al. to produce ammonia and hydrogen chloride, and to later recover MgO for eventual recycle back to the process, according to the formula on line 39 of that patent, i.e.:

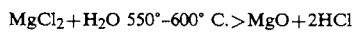
$$MgCl_2 + H_2O \; 550°-600° \; C. > MgO + 2HCl$$

On the other hand, it is not the intent of the embodiment to produce HCl, and recycle the alkaline earth hydroxide ($Ca(OH)_2$). Rather, the intent of the embodiment is to produce $CaCl_2$ for potential later use and to recycle only the ammonium hydroxide produced to make $(NH_4)_2CO_3$ for use in the ion exchanger.

Secondly, it is important in the process of the embodiment to first produce slaked lime ($Ca(OH)_2$) from calcium oxide (CaO) prior to reaction with $NH_4Cl$. This is to ensure a more complete and less violent reaction with $NH_4Cl$ then can be obtained using CaO directly, which directly affects the recovery of ammonia and water via the steam stripping system. An initially prepared hydroxide allows for better $NH_3$ recovery under more controlled conditions (i.e. less foaming and "air lift") compared with direct use of the oxide. Ammonia recovery of 99.9% was demonstrated in pilot test work. The Lynn, et.al. patent did not cite the need to first form the hydroxide (of magnesium) from the oxide.

Although the reaction of $CO_2$ with caustic ammonia to form $(NH_4)_2CO_3$ solution is well known in the art, and was first the subject of British Patent 2118, the system utilized in the embodiment is unique in that $(NH_4)_2CO_3$ solution for recycle is formed from two different streams in the same apparatus (absorber), and is an integral part of the overall process. In the embodiment residual ammonium carbonate in the $K_2CO_3$ solution produced in the ion exchanger is steam stripped as $NH_3 + CO_2 + H_2O$ and removed from said solution according to Step 2. As well, residual ammonium hydroxide in the $CaCl_2$ solution is steam stripped as $NH_3 + H_2O$ and removed from said solution according to step 4. Both streams enter an ammonium carbonate absorber at different locations, along with a separate incoming stream of $CO_2$ gas from either the lime calciner or outside source. The absorber allows both the reaction of $NH_3 + CO_2$ to occur, and the formation of a saturated $(NH_4)_2CO_3$ solution by cooling and condensing to take place in different increments.

DESCRIPTION OF THE PREFERRED EMBODIMENTS

Figure 1:
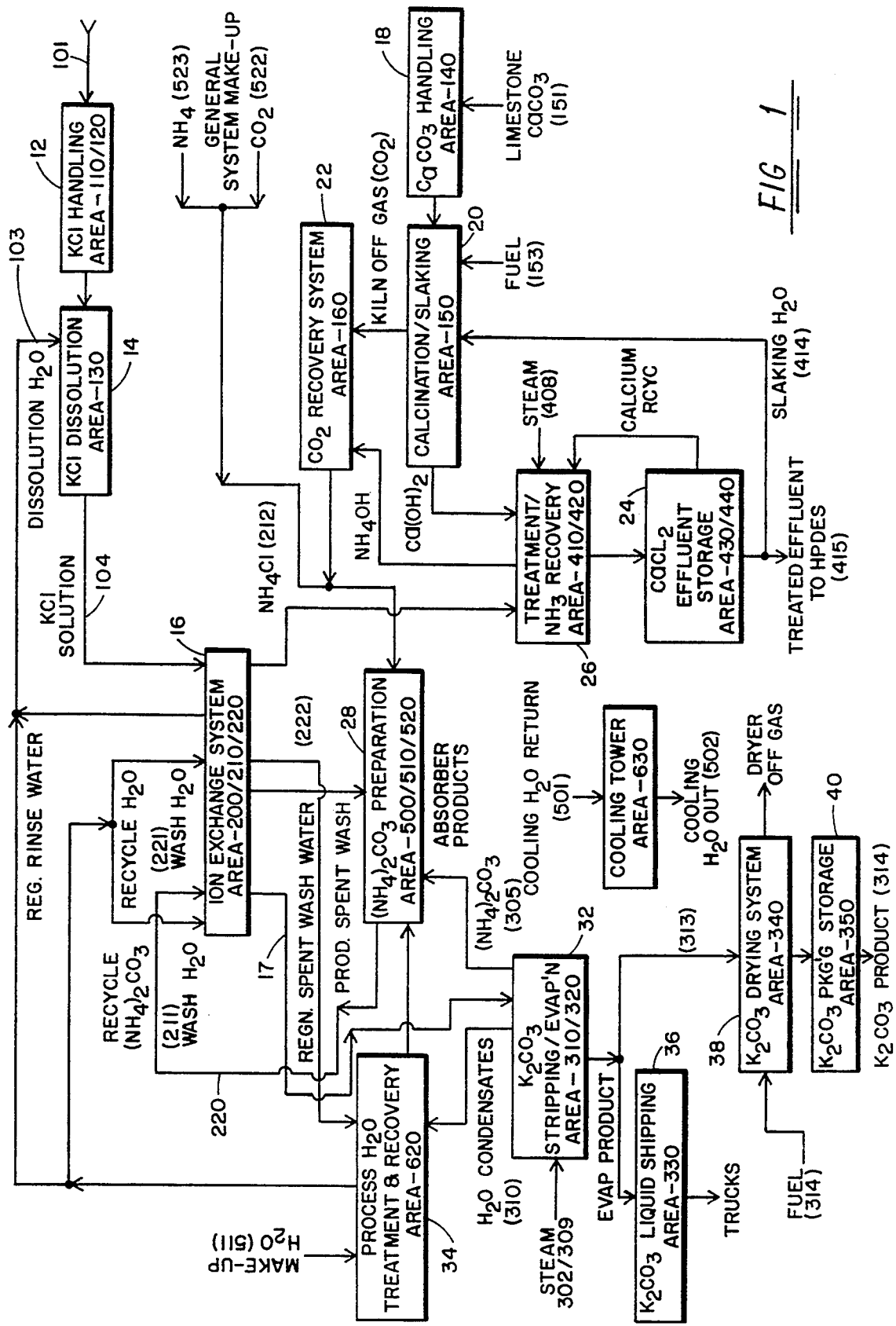
FIG. 1 is a system block diagram illustrating the overall process steps for the base case potassium carbonate process.

Referring to FIG. 1, the incoming raw materials for the overall process are potassium chloride and limestone, or alternatively burnt lime and carbon dioxide. FIG. 1 is a simplified overall diagram of the inventive process. A detail diagram is shown in FIGS. 5A-5L and components not shown in FIG. 1 can be seen in FIGS. 5A-5L.

Potash or potassium chloride (KCl) in dry form (stream 101) from conventional commercial sources is received and stored in a conventional storage bin, step 12. The dry potash (KCl) is next transferred from the storage bins to a brine tank 14 such that sufficient excess KCl is present to ensure that the brine is saturated. Make-up water (stream 103) to the brine tank is preheated with steam in a heat exchanger to overcome the negative heat of solution resulting from KCl dissolution. Overflow from the brine tank, consisting of saturated KCl, is stored in a KCl solution surge tank (See FIG. 5A).

Saturated KCl solution (stream 104) is first fed through a polishing filter of a type well known in the art, to remove traces of suspended solids from the solution. The filtered KCl solution is then fed to a continuous countercurrent ion exchange system, step 16, through a supply header.

The potassium chloride, KCl, and ammonia $(NH_4)_2CO_3$ are selectively fed into the continuous countercurrent exchange system, step 16. The exchange system results in the formation of potassium carbonate, $K_2CO_3$ and ammonium chloride, $NH_4Cl$. The $K_2CO_3$ is steam stripped in step 32, to remove residual ammonium carbonate and the resulting solution is evaporated and dried to produce a solid $K_2CO_3$ product. The ammonium chloride is mixed with a lime slurry to recover ammonia in step 26. The ammonia is combined with $CO_2$ from calcined off-gas or from an outside source to produce ammonium carbonate for subsequent recycle to the cation exchange system, step 22.

Before proceeding, it should be noted that countercurrent ion exchange for purposes of this application is a contacting technique wherein increments of ion exchange resin are contacted either in a continuous or batch fashion with progressively stronger feed solutions. For example, in the production step of the present process, ammonium carbonate is used to remove potassium from the resin (to produce potassium carbonate) with subsequent conversion of the resin from the potassium form to the ammonium form. In the countercurrent concept, resin in essentially the potassium form enters the so-called production zone, i.e., the step in the process wherein it will be contacted with ammonium carbonate and first contacts a solution which has previously contacted resin; thus, this solution which is contacting the incoming resin contains ammonium and potassium ions. This allows for the solution which is weakest in terms of the ion to be exchanged (in this case, ammonium) to contact the resin which is strongest in the ion which is to be put into the solution phase (in this case, potassium). Subsequently, as the resin increment moves through the so-called contacting region, it will be contacted with progressively more concentrated ion to be exchanged (ammonium) solution so that at the end of the countercurrent contact the increment of resin which is substantially in the ammonium form with some residual potassium is contacted with essentially pure ammonium carbonate solution; thus maximizing so-called driving force.

Limestone is received, in step 18, and transferred to a surge bin. The limestone is then fed to a calcination system in step 20. The calcination can be carried out in conventional rotary, shaft, or fluid-bed calciner. The calciner converts the limestone to calcium oxide. The preferred fuel for the calcination system is natural gas. Carbon dioxide-rich off gas, from the limestone decomposition and combustion by-product, is passed through a dust collector; then processed for $CO_2$ recovery, step 22. The reaction associated with the recovery process is as follows:

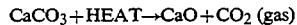
$$CaCO_3 + HEAT \rightarrow CaO + CO_2 \text{ (gas)}$$

In step 20, lime is transferred to a slaker and mixed with treated aqueous effluent obtained at step 24 to produce slaked lime. The effluent water makeup is ratio controlled to the lime feed rate. Slaked lime is then degritted and transferred to a surge tank. The lime slaking reaction is as follows:

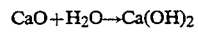
$$CaO + H_2O \rightarrow Ca(OH)_2$$

Alternatively, $CO_2$ in liquid form and burnt lime (CaO) can be purchased directly from suppliers thereby eliminating the need for a lime calcination and $CO_2$ recovery system. The choice would depend on local economical factors. If purchased $CO_2$ and CaO were used, step 18 would convert to a burnt lime handling system, step 20 would only involve lime slaking, and a liquid $CO_2$ handling and storage system would be added to feed step 22.

A slight excess of water is added to the slaked lime to produce a pumpable lime slurry solution. Lime slurry is transferred to step 26 which is an effluent treatment system for use in converting spent ammonium chloride to calcium chloride with subsequent ammonia recovery.

The $CO_2$-rich off gas from the limestone calciner is transferred from the dust collector in step 20 to the $CO_2$ recovery scrubber in step 22. Alternatively purchased $CO_2$ could be introduced directly to step 22. The $CO_2$ gas is contacted in step 22 in a countercurrent scrubber arrangement with ammonium hydroxide solution obtained in step 26. The amount of gas entering the scrubber is ratio-controlled from the ammonium hydroxide make-up to allow for the production of an ammonium carbonate solution, with a slight amount of ammonium bicarbonate via the following reactions:

$$2NH_3 + H_2O + CO_2 \rightarrow (NH_4)_2CO_3$$

$$(NH_4)_2CO_3 + CO_2 + H_2O \rightarrow 2NH_4HCO_3$$

The solution from step 22 is transferred to step 28, where it is combined with recovered ammonium carbonate from the potassium carbonate stripping/evaporation, step 32. Make-up $NH_3$ and $CO_2$ can be added along with process water to produce a recyclable ammonium carbonate.

The ammonium carbonate solution (stream 220) is then transferred from step 28 to the continuous ion exchange system in step 16. The nature of the continuous ion exchange system is such that either a carbonate or bicarbonate form of the exchanging cation can be accepted. The slight amount of ammonium bicarbonate fed to step 16 will result in the formation of a small portion of potassium bicarbonate in the ion exchange circuit. Upon drying, potassium bicarbonate decomposes and the slight excess of $CO_2$ is released and exits with the water vapor from the drying system in step 38.

Having a slight amount of bicarbonate in step 28 allows for pH control in the overall ammonium carbonate reclamation and reconstitution system. Since the pH of the bicarbonate is lower than the carbonate, the relationship can be used to "trim" the circuit in step 28 and will lead to subsequent optimization as to the most practical ratios for ongoing system operation. Further, a slight amount of bicarbonate ensures that all of the ammonium ion ($NH_4$) is in an exchangeable form, with respect to the continuous ion exchange operation. Previous approaches using fixed-bed, non-continuous ion exchange systems required a large excess of bicarbonate in order to achieve reasonable equilibrium. The new approach does not have this limitation.

The cation exchange approach in step 16 is carried out in a continuous system of the pulsed bed design, although other continuous type IX systems may be employed (e.g. simulated continuous using a series of fixed-bed units and an automatic control valve manifold circuit).

Figure 2:
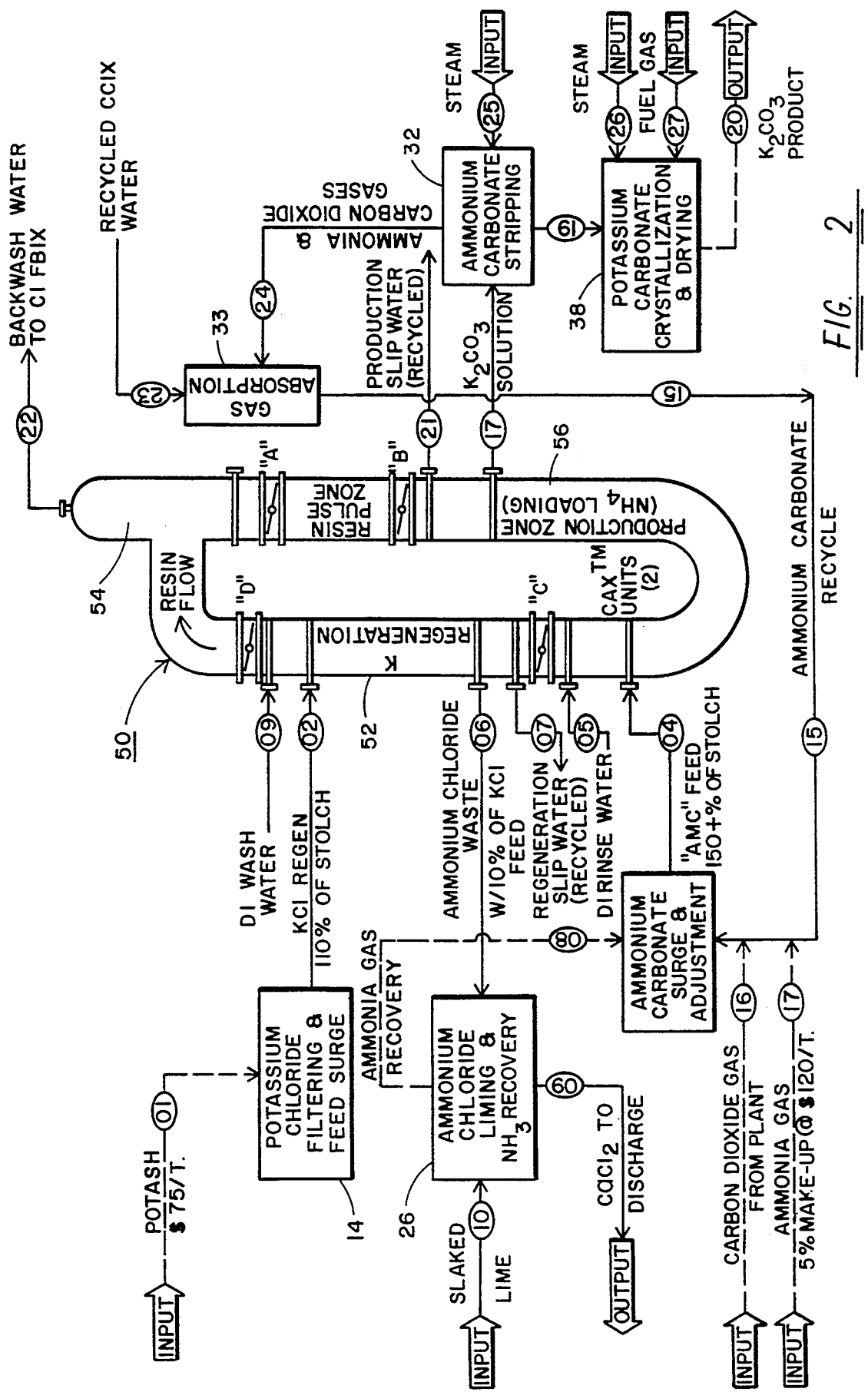
FIG. 2 is a pictorial block flow diagram illustrating in detail and example of one type of continuous countercurrent ion exchange system useful in the process that is referenced as step 16 in FIG. 1.

The pulse bed continuous ion exchange system in step 16 is further illustrated in FIG. 2. It consists of one or more countercurrent pulse bed CCIX ™ "loops" 50 manufactured by Tetra Technologies, Inc. In the CCIX loop 50, cation resin is pulsed through the loop frequently and countercurrently to solution flow through the different treatment zones.

In this system valves A,B,C,D are used to allow resin increments to move in a circle around the ion exchange loop. During operation the larger valves on the main ion exchange resin containing loop are closed and fluid valves are opened so that various zones are being operated simultaneously. After a short period of time, fluid valves shut and resin valves open so as to allow the resin to move in a circular fashion a short distance around the loop. This distance represents one "increment". Water is used as the hydraulic motive force to push the resin in the appropriate direction.

Other methods for countercurrent contacting can be carried out using simulated continuous systems wherein several batch columns are connected via a manifolding arrangement so as to simulate the effect of moving increments of resin by shifting the location of fluid feed points via the manifold arrangement. Further, continuous ion exchange systems wherein the resin is physically moved, such as units which have been operated in Europe for a number of years, are also applicable to this method for achieving countercurrent operation. The pulsed bed system is shown for illustrative purposes and is not intended to limit the process to a specific contacting method.

The basic ion exchange sequence, using this apparatus in step 16, consists of the following discrete operations which occur in a predetermined sequence (refer to FIG. 2).

In a first step, a saturated potassium chloride solution (stream 02) is fed countercurrently to the regeneration zone of the continuous ion exchange system, where the resin is already in the ammonium ($NH_4^+$) form. In the regeneration zone 52, the resin exchanges its ammonium ($NH_4^+$) ions for potassium ($K^+$) ions in solution according to the following reaction:

$$R\!-\!NH_4^+ + KCl \rightarrow R\!-\!K^+ + NH_4Cl$$

where R represents the cation exchanger resin.

Ammonium chloride solution containing less than 10% of the K ions fed to this zone exits at the bottom of the zone 52 (stream 06) and is routed to the liming and ammonia recovery process, step 26. Ammonium chloride exits the ion exchange system via the spent regeneration fluid and is accumulated in the ammonium chloride effluent tank. This spent regen fluid exits the lower left hand side of the ion exchange loop shown pictorially in FIG. 2. Regenerated resin is then physically moved via "pulsing" into a washing zone 54 where wash water (stream 03) is introduced to remove entrained KCl in order to: (1) push back KCl entrained in the pulsed resin down into the regeneration zone, and (2) remove most of the chloride impurities entrained in the resin. Resin backwashing further washes entrained chloride.

After the resin is washed, it enters, via the pulsing technique, a production zone 56. Again, a countercurrent approach is used and the resin is contacted with an ammonium carbonate solution (stream 04). The resin pulse zone is the flow controller for resin flow through the ion exchange loop. Regenerated resin is then loaded with ammonium ($NH_4^+$) ions from the ammonium carbonate solution which comes from step 28 (FIG. 1). The ammonium ions displace the potassium ($K^+$) ion on the resin sites via the following reaction:

$$2R\!-\!K + (NH_4)_2CO_3 \rightarrow 2R\!-\!NH_4 + K_2CO_3$$

A nearly saturated solution of $(NH_4)_2CO_3$ is fed to this "production" zone 56 at a stoichiometric feed ratio of about 200%, and the carbonate solution exiting the zone (stream 18) is a mixture of $K_2CO_3$ and $(NH_4)_2CO_3$. $NH_4^+$ loaded resin is rinsed with DI water (stream 05) to push back ammonium carbonate advanced with resin. The cycle is then repeated as $NH_3$-loaded resin reenters the regeneration zone. For the most part, resin stays in the ion exchange loop. In the washing zone, which is the vertical protrusion 54 located on the top right hand side of the ion exchange loop, water is used to wash the resin and remove residual regenerant material (KCl). Some resin can be entrained in this water stream and is collected in the resin recovery tank (T-509) which is located at the top right of the ion exchange loop (not shown in FIG. 2). This resin is recovered and recycled back to the ion exchange column. Movement of the resin in the column is achieved periodically using pressurized water to push the resin in a circular motion.

The transfer of the resin to the production zone and, for that matter, throughout the entire loop, is as just indicated, via hydraulic transfer. The loop can be envisioned as a donut containing resin—there is no gap in the loop and the resin is always flooded with a liquid. Thus, if water is introduced in the pulse zone, which is stream #28 on the flow diagram, and the appropriate loop valves are open, which would be all valves in the loop except the valve "A" located above the pulse zone, the resin will move in a clockwise fashion. Water is injected into the pulsing zone for a short period of time sufficient to move a small increment of resin in a clockwise direction. After the resin has moved, the larger valves shut and the fluid flows are re-initiated to re-establish countercurrent operation.

The operating temperature for the ion exchange system would normally be within the allowable ranges for the ion exchange resin. Typically, a temperature of from 50° F. to 160° F. is considered acceptable with 70° F. to 100° F. preferred. The allowable flow is set by resin hydraulic limitations.

Considering both FIGS. 1 and 2, potassium carbonate solution from the ion exchanger 50, step 16 (stream 18) is fed to an ammonium carbonate stripper in step 32 and contacted with steam (stream 25), in a countercurrent fashion, to remove residual ammonium carbonate from the solution. Overheads from the stripper enter a scrubber in step 33 and are contacted with a recirculating stream of ammonium carbonate, and make-up water. Solution is circulated from the bottom of the ammonium carbonate stripper through a reboiler and indirectly contacted with steam to generate vapor for the stripper. Treated potassium carbonate is discharged (stream 19) from the vessel and transferred to an evaporation system at step 38.

Recovered ammonium carbonate solution from step 32 is fed to the ammonium carbonate trim tank in step 28 where it is mixed with other recovered streams and "trimmed" to produce ammonium carbonate (A/C) for recycle to the ion exchange circuit. The scrubbing solution is recycled and cooled in step 32 to maximize ammonium carbonate recovery. Off-gases from the A/C scrubber (stream 24) are transferred to the general plant ammonia scrubber, (not shown) for final ammonia recovery/removal.

Stripped potassium carbonate solution in step 32 is evaporated and concentrated. For energy efficiency, the solution can be evaporated in a multiple-effect evaporator system, in order to economically minimize the amount of steam required for this step of the process. The solution is treated in the multiple effect system and the potassium carbonate concentration increased from 15-18% to approximately 60 percent $K_2CO_3$ by weight. It should be noted that higher concentrations of $K_2CO_3$ can be used depending on down-stream product characteristic requirements. For instance, if crystalline material is desired, the solution can be concentrated to a slurry containing in excess of 75%/wt $K_2CO_3$.

A portion of the concentrated product solution can be transferred and blended with some of the incoming potassium carbonate in the liquid product blend tank in step 36 (FIG. 1) to produce a nominal 47% $K_2CO_3$ by weight solution. The resulting product liquid can then be shipped or transferred within the plant for other uses.

With reference to FIG. 1, the concentrated potassium carbonate (stream 313) is then fed to a gas-fired fluid bed drying system in step 38. Material is distributed onto a recycled portion of product fines; resulting in the "building up" of a product granule. The material is dried to remove residual moisture and water of crystallization. After drying, the material is cooled then discharged to a product screen. Product from the screen is transferred to step 40 for storage and shipping.

Oversize material from the screen is crushed and then recycled to the front-end of the dryer. Fines and dust from the dryer are collected and returned, along with undersize product material, to the front end of the dryer system, step 38. Off-gases from the dryer are treated for maximum particulate removal.

The $NH_4Cl$ solution (stream 212) from the continuous ion exchange system consists primarily of ammonium chloride and a slight amount of KCl, which represents the KCl loss from the system. It is pumped to an agitated tank in step 26 and mixed with lime slurry obtained from step 20. The amount of lime slurry is ratio controlled from the net $NH_4Cl$ flow rate. The lime and ammonium chloride react as follows:

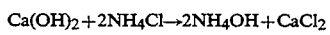

$$Ca(OH)_2 + 2NH_4Cl \rightarrow 2NH_4OH + CaCl_2$$

The limed effluent overflows to a raked clarifier for removal of residual solids. A portion of the underflow is purged from the system; the remainder is returned to the mix tank.

Overflows from the clarifier is then pumped to the ammonia stripper in step 26 wherein steam is injected to remove ammonia from the solution. The overheads from the stripper enter an ammonia absorber in Step 26 and are contacted with absorber solution (water) to form an ammonium hydroxide solution. The ammonium hydroxide solution is recirculated to maximize ammonia recovery. Recovered ammonium hydroxide solution is fed to Step 22 where $CO_2$ is recovered. Off-gas from the absorber is transferred to a general gas scrubbing system (not shown).

The low ammonia, calcium chloride solution is then fed to Step 24. This treated effluent is monitored and discharged into the plant effluent system or else held for further processing (stream 415). A portion of the treated effluent (stream 414) is returned to Step 20 for use in lime slurry preparation.

Ammonium carbonate solution from Step 22 and Step 32 are mixed in the Step 28 along with process water. The amount of water is controlled so that the proper density is maintained in the vessel.

As indicated earlier, a slight excess of $CO_2$ would be maintained in the system due to the extra uptake in the Step 22 $CO_2$ recovery circuit. A pH indicator/controller is used to adjust the ammonia makeup from a nurse tank system in Step 28 that the proper $NH_4/CO_3$ ratio is maintained in the solution overflowing the trim tank.

The resulting ammonium carbonate solution is surged, then returned (stream 220) to the ion exchanger in Step 16. If additional $CO_2$ is required, a nurse tank would be used to supply the gas to Step 28.

The foregoing description ends what is described hereafter as the base case process.

PROCESS OPTIONS

Figure 3:
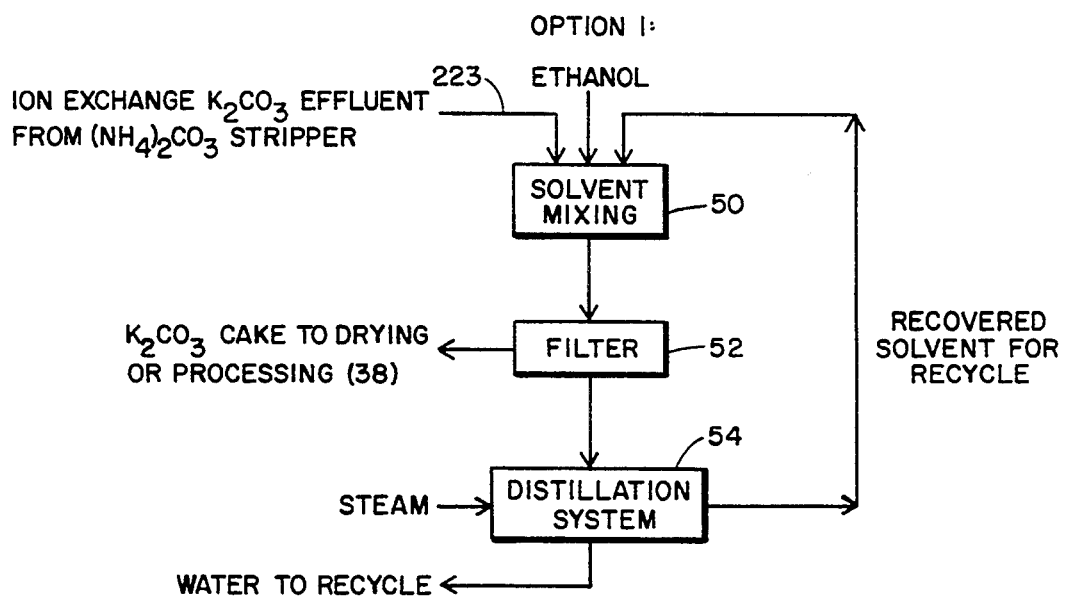
FIG. 3 is a block diagram of a first preferred embodiment in which $K_2CO_3$ is mixed with ethanol to reject $K_2CO_3$ precipitate.

Referring now to FIG. 3, there is shown as Option 1 in this embodiment, a processing step which involves the treatment of the potassium carbonate solution exiting the ammonium carbonate stripping process in Step 32 with a selected alcohol. This Option 1 would in essence, replace the conventional multiple-effect evaporation system and a portion of the drying system described in the base process (Steps 32 and 33), with the objective of reducing overall energy consumption to recover $K_2CO_3$ as a dry product, or alternatively as a 47% liquid solution.

The $K_2CO_3$ solution exiting the $(NH_4)_2CO_3$ steam stripper is first mixed with concentrated ethanol in Step 50, which by virtue of solubility considerations, results in the rejection of the salt ($K_2CO_3$) from the liquid phase. This "solvent rejection" technique relies on the fact that water is soluble in the alcohol, whereas the $K_2CO_3$ solubility decreases as the alcohol concentration increases.

The slurry is then filtered in Step 52, to remove the $K_2CO_3$ crystals, which can then be dried, screened and sized as in the base case process; or alternatively redissolved for production of a $K_2CO_3$ solution intermediate. The liquid, containing the alcohol/water solution is transferred to a distillation column Step 54 for recovery of the alcohol, in a concentrated form. The water is recycled to the KCl dissolution (Step 14 in the base case process), thus conserving any contained potassium value.

The advantage of this technique, in the proper application, is that energy requirements may be reduced, or the process simplified, since the amount of energy required to distill the alcohol/water mixture may be less than that required for evaporation of water only. This approach could be applicable in unique product situations; for example, those in which a liquid solution intermediate is desirable for use in the production of other K-salt products.

Figure 4:
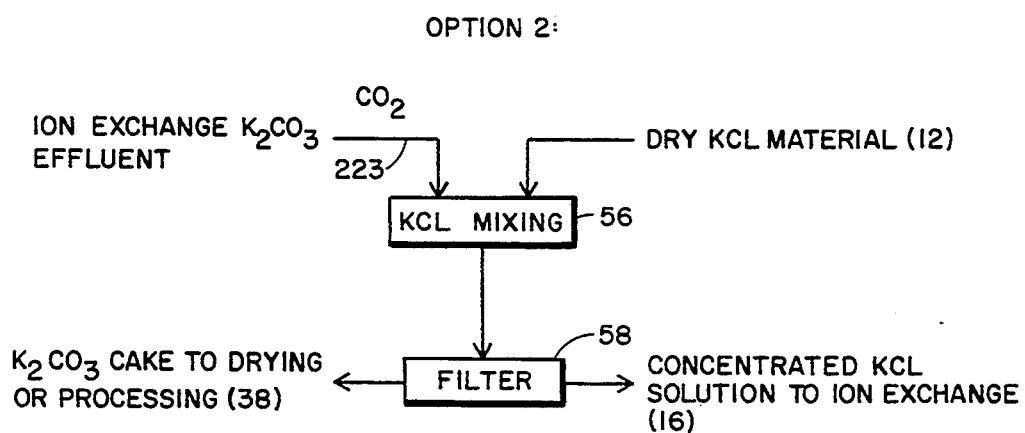
FIG. 4 is a block diagram of a second preferred embodiment whereby $K_2CO_3$ is carbonated using $CO_2$ gas, and $KHCO_3$ precipitated using KCl.

Referring to FIG. 4, there is shown, as Option 2, a "salt out" technique which relies on the decreasing solubility of $KHCO_3$ (potassium bicarbonate) in KCl (potassium chloride) solutions in order to make potassium bicarbonate from potassium carbonate solution:

In FIG. 4, the water in the $K_2CO_3$ (carbonate) solution from Step 16 may be partially evaporated to increase its carbonate concentration, and then converted to the bicarbonate form, via the addition of $CO_2$ gas into the carbonate solution. The $KHCO_3$ solution is then mixed with a dry, incoming KCl in Step 56.

The solubility of potassium bicarbonate decreases as the concentration of the KCl increases, resulting in the precipitation, or "salting-out" of the $KHCO_3$ from the KCl solution. The slurry is filtered in Step 58, and the $KHCO_3$ cake recovered. The concentrated KCl is transferred to the ion exchange system (Step 16 in the base case process) for use in the ion exchange regeneration Step. In this manner, the KCl is used to "drive" out the $KHCO_3$ before it is used in the ion exchange system.

The advantage of this system is to produce a $KHCO_3$ product by using dry KCl and thereby converting the incoming KCl to liquid form for use in the base case ion exchange process (Step 16) to make $K_2CO_3$, thereby eliminating Step 14 in the base case process.

DRYER OPERATIONAL METHOD

As indicated, the potassium carbonate produced in the U.S. is, for the most part, produced from the reaction of potassium hydroxide solution and $CO_2$, from combustion gases, in a fluid bed reaction/drying system. The system is operated so as to produce a hard, spherical, dense granule which is ideal for a number of applications, especially glass production.

Potassium carbonate may also be manufactured from KOH and $CO_2$ in a solution phase so that an intermediate potassium carbonate sesquihydrate crystal ($K_2CO_3.1.5\ H_2O$) is formed. This material is dried in conventional systems such as fluid beds, and the resulting product has a more crystalline shape, tends to be lighter, and has a greater tendency for dusting. As the crystal dries, the water of crystallization exits the structure and forms "tunnels" in the crystal. These tunnels result in a decreased density of the particle which are undesirable if a dense particle is to be made.

The present application describes a process which results in the direct formation of potassium carbonate solutions in a straightforward manner and allows the development of a method for the production of a denser, anhydrous granule from a carbonate solution. The following describes a technique which allows for the production of a dense, spherical particle from a potassium carbonate feed solution utilizing a fluid-bed drying system.

Figures 5, 5A:
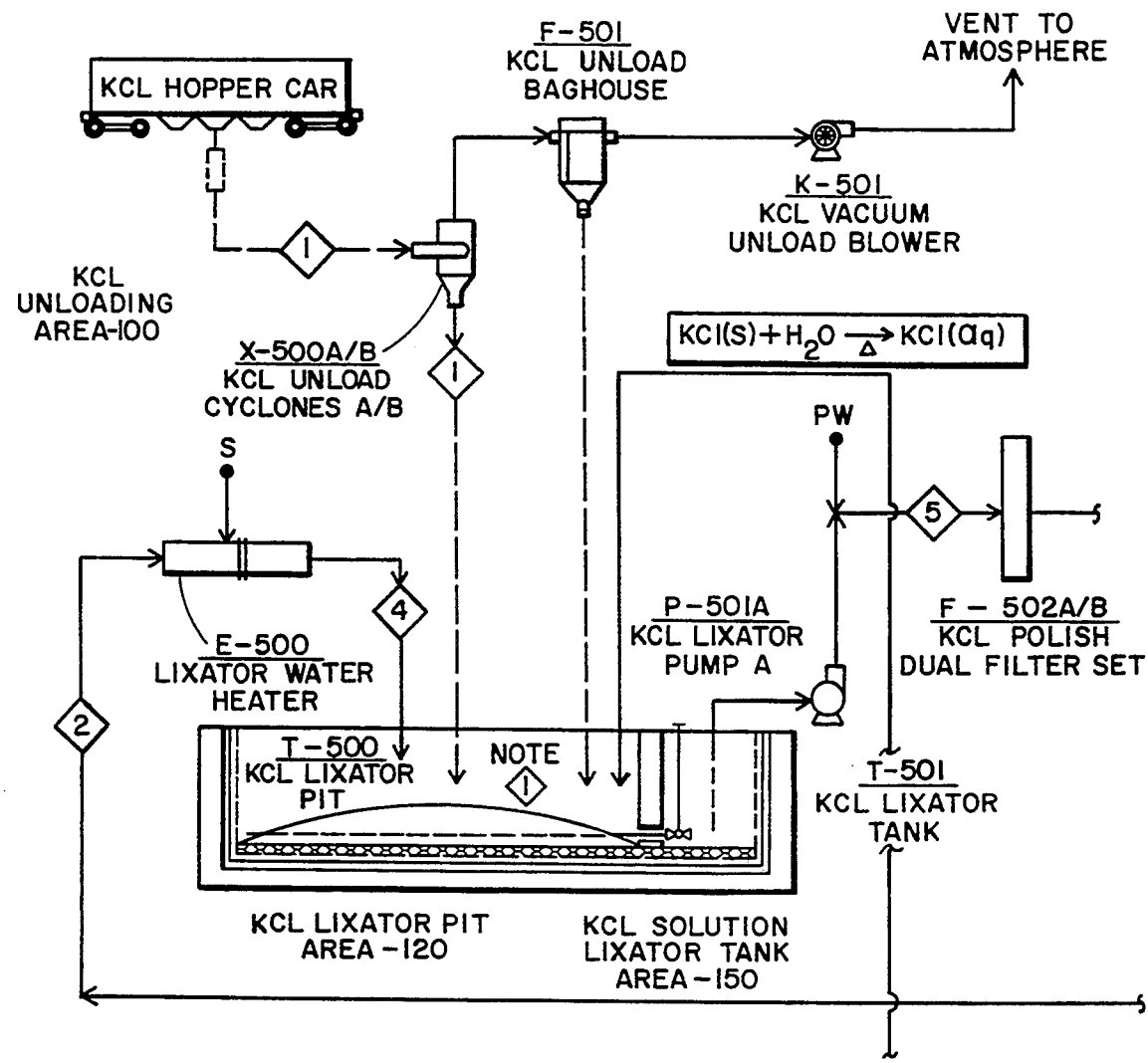
FIG. 5 is a block diagram showing the arrangement of FIGS. 5A-5L.
FIGS. 5A-5L illustrate a detail process for production of potassium carbonate in accordance with the present invention.
Figure 5B:
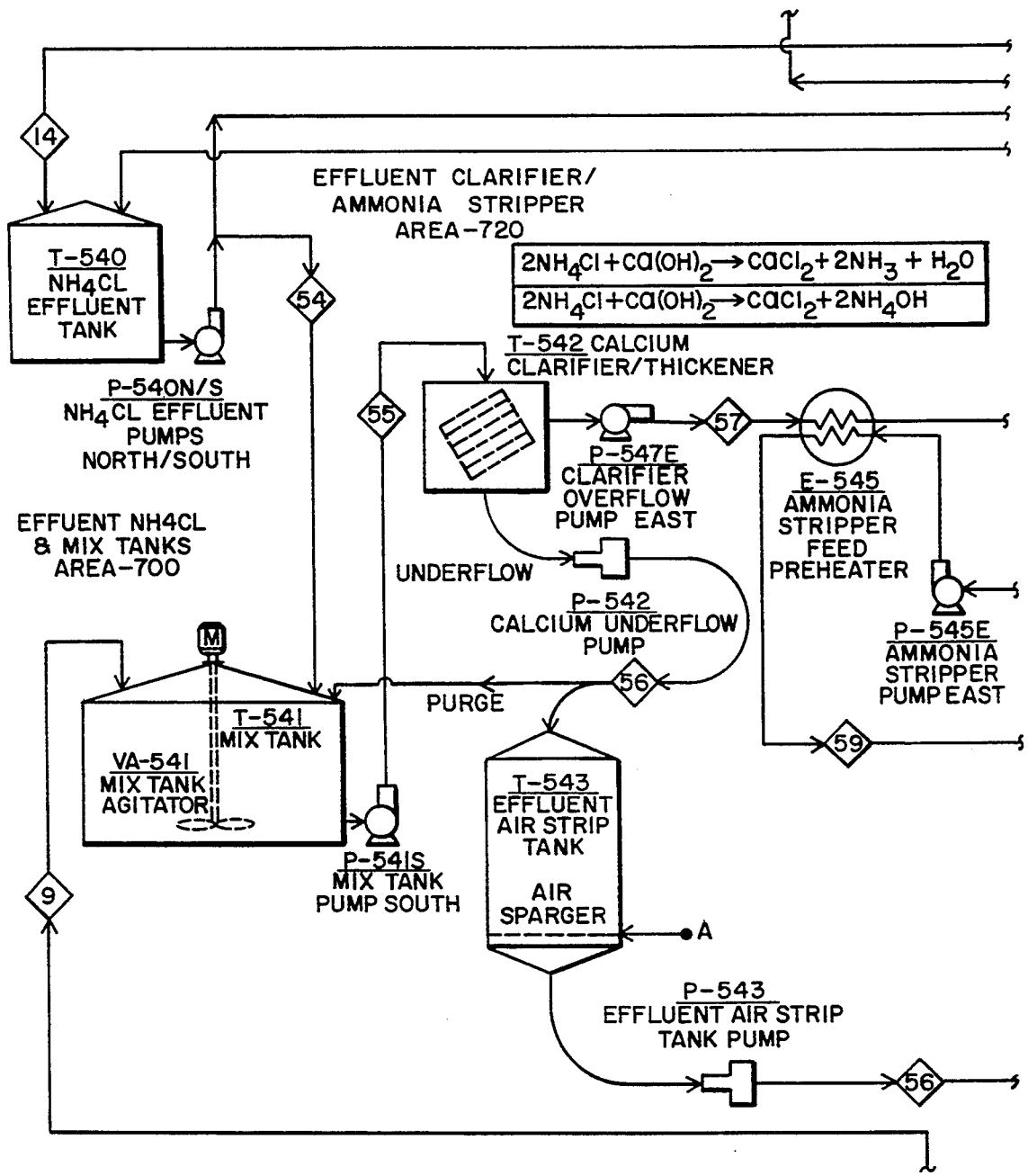
Figure 5C:
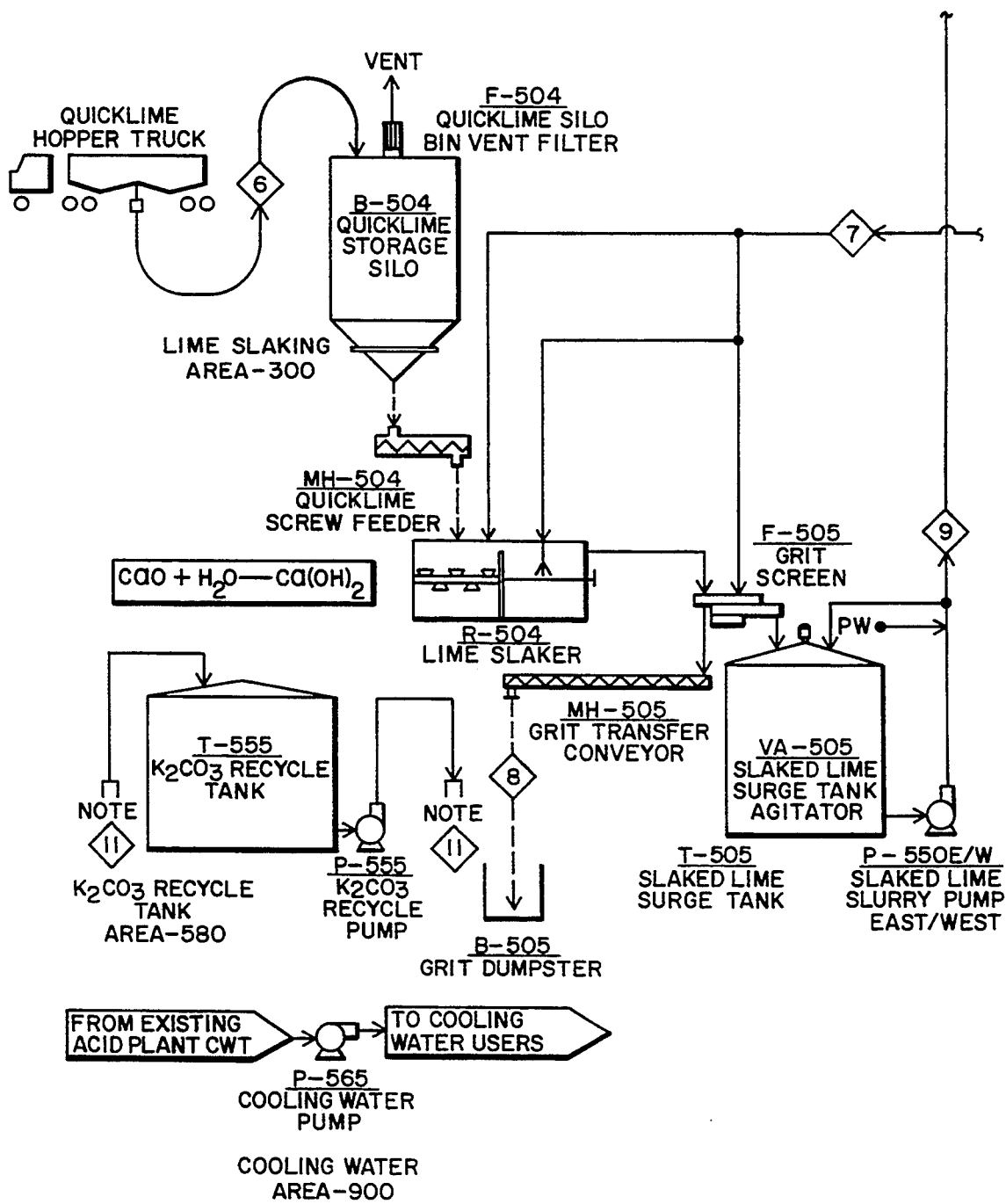
Figure 5D:
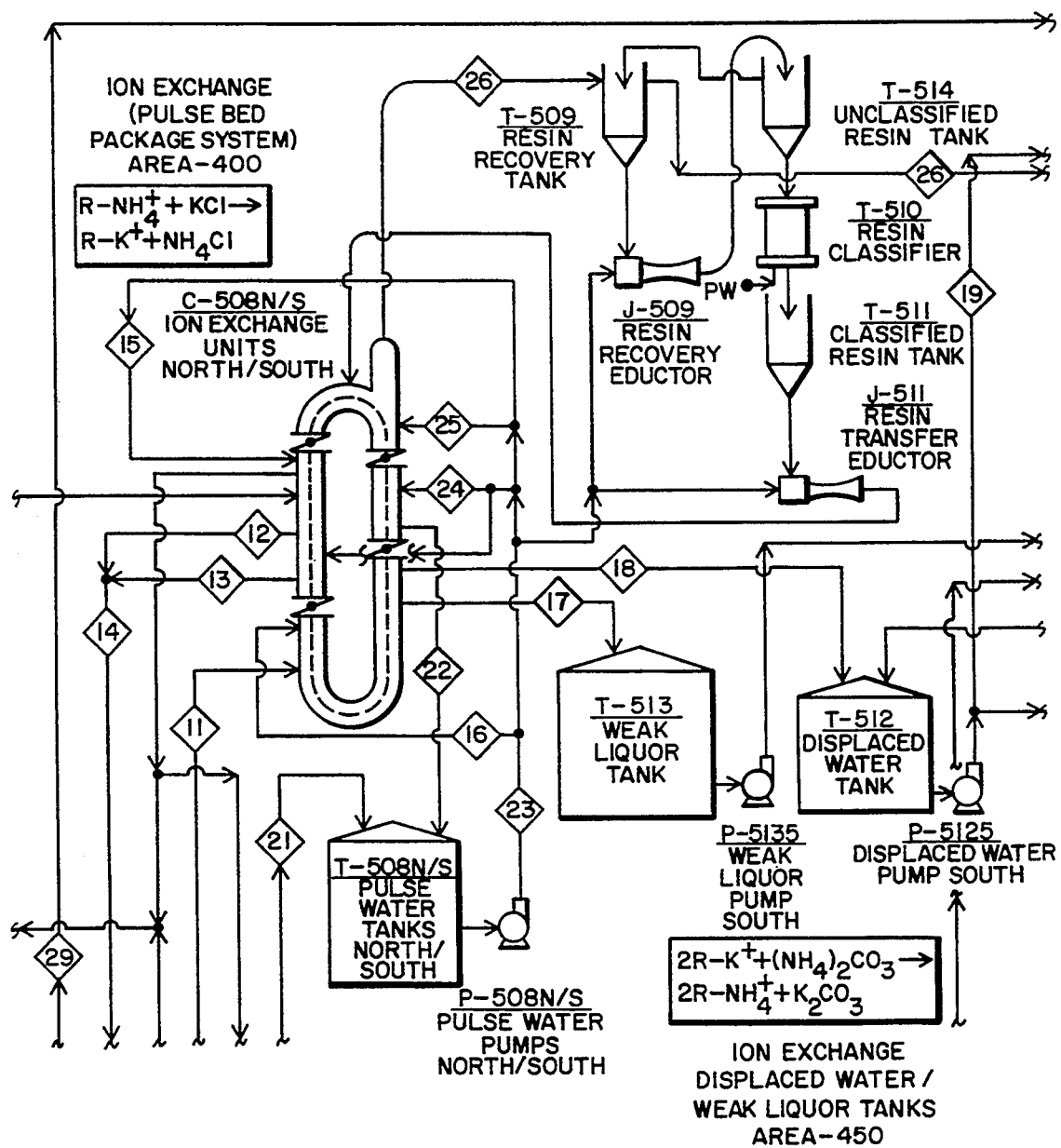
Figure 5E:
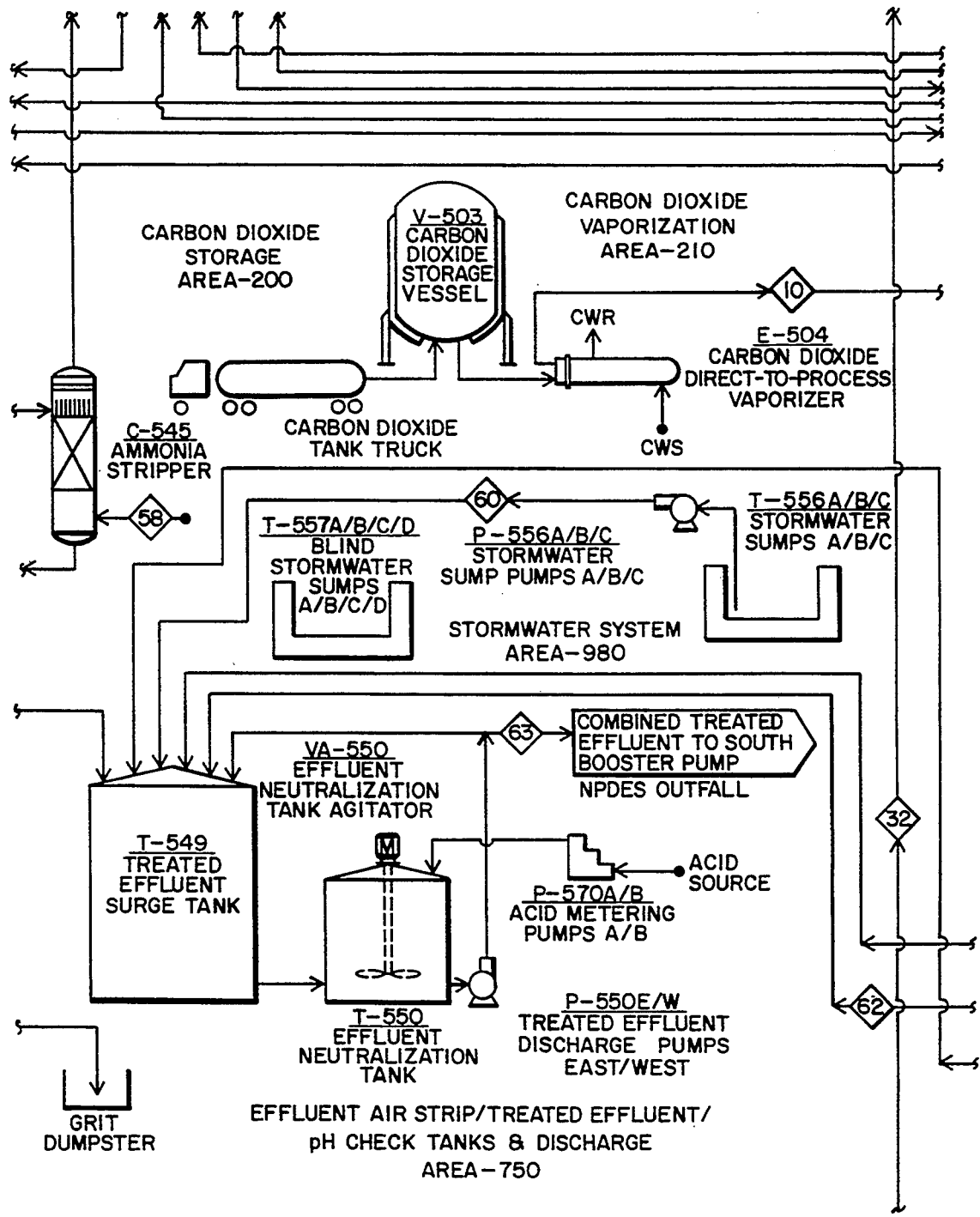
Figure 5F:
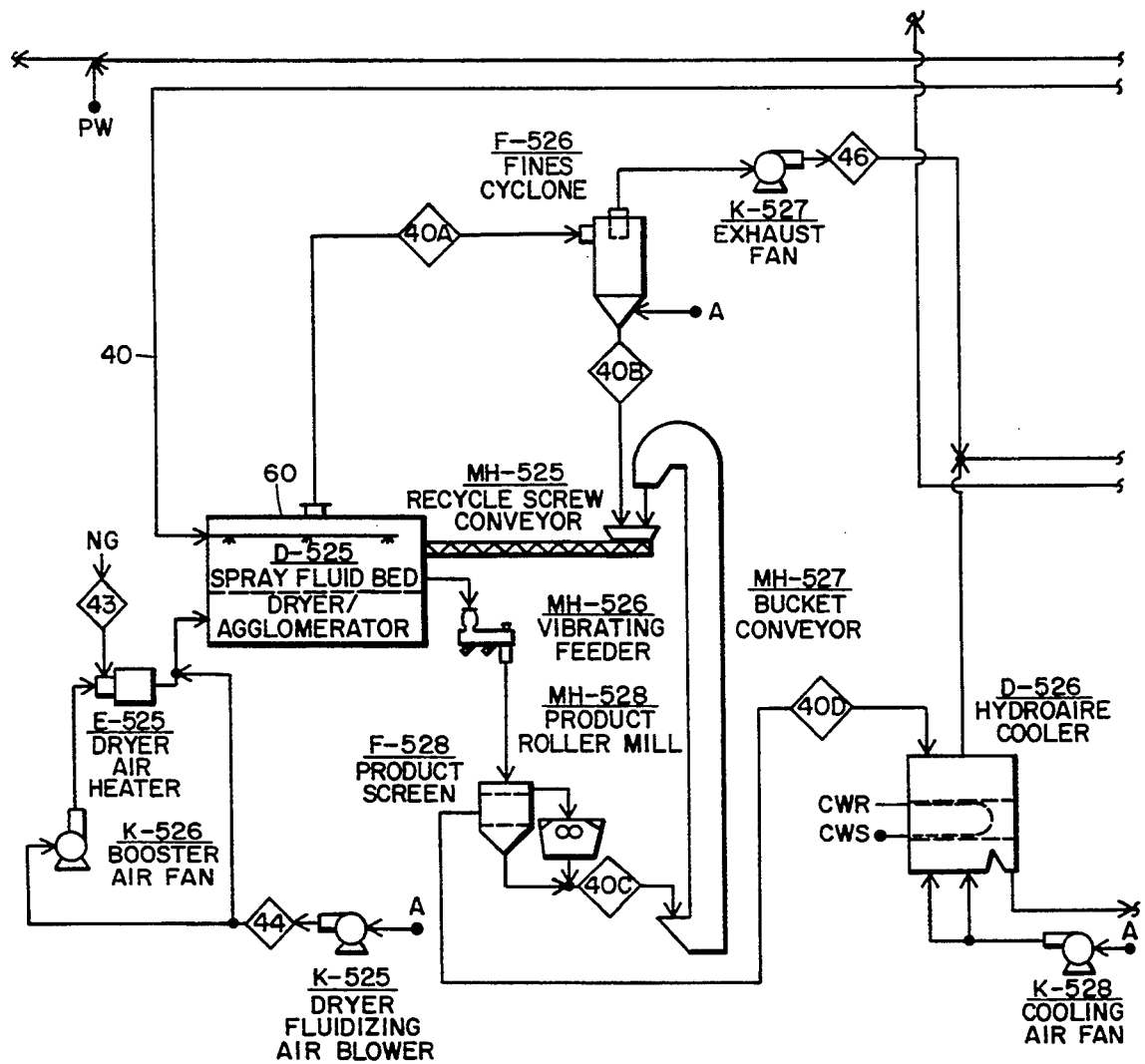

In this inventive method and referring to FIG. 5, a saturated solution of potassium carbonate stream 40 at elevated temperature is fed to a conventional fluid-bed dryer 60. It has been found that feeding a solution at elevated temperature, as opposed to a slurry or filter cake, will allow for an anhydrous carbonate material to be formed directly, thus bypassing the formation of the sesquihydrate material, which when decomposed to the anhydrous form tends to "lighten" the product. This is an unexpected finding since it has generally been assumed that during the drying process of either a solution or cake, the material would first go through a sesquihydrate stage followed by the dehydration step. This apparently is not the case. Rather, the indications are that by keeping the carbonate totally in solution, then feeding the material to the dryer at an even higher temperature, the crystal goes directly to the anhydrous form resulting in a more dense granule which is spherical in shape.

The amount of recycle and dryer residence time employed have also been found to have an effect on the quality of the carbonate product. In "conventional" potassium carbonate production, from either KOH solution or $K_2CO_3$ crystal drying, a certain amount of material is recycled back to the dryer as undersize (collected from the dust control systems), and crushed oversized material. It has been found that an increase in the amount of material recycled, including, if need-be, a portion of the product, improves the quality of the resulting granule. As the recycle increases, the granule takes on a smoother appearance and becomes harder with less tendency to dust.

The residence time in the dryer is also important to allow for proper formation and "curing" of the granule. In a typical fluid bed system, this residence time can easily be achieved by allowing for the system to operate with a fairly deep bed of material in the dryer.

As a result of the discovered operational techniques, it is possible to use potassium carbonate solutions as feedstocks to produce improved product physical quality, compared to that presently produced from crystals. The basic conditions for the process are as follows:

A solution of potassium carbonate at a concentration of 60% by weight and a temperature of about 220° F. is fed to a fluid bed dryer system operating at a temperature of at least 300° F.;

The solution is sprayed onto a bed of material in the dryer which is vigorously fluidized;

A stream of recycled material consisting of fines, crushed oversized, and product in an amount equal to about 4 to 8 times the weight of the net product, is also fed to the dryer;

The depth of the material is maintained so as to allow for a residence time of at least 30 minutes, and preferably 60 minutes minimum. The advantages for this approach include:

The ability to use potassium carbonate solutions to produce improved physical quality product over that which would normally be produced from $K_2CO_3$ crystals;

Formation of the anhydrous $K_2CO_3$ material directly, at lower temperatures, thus minimizing the required operating temperature for the dryer.

POTASSIUM CARBONATE SOLUTION STRIPPING

Figure 5G:
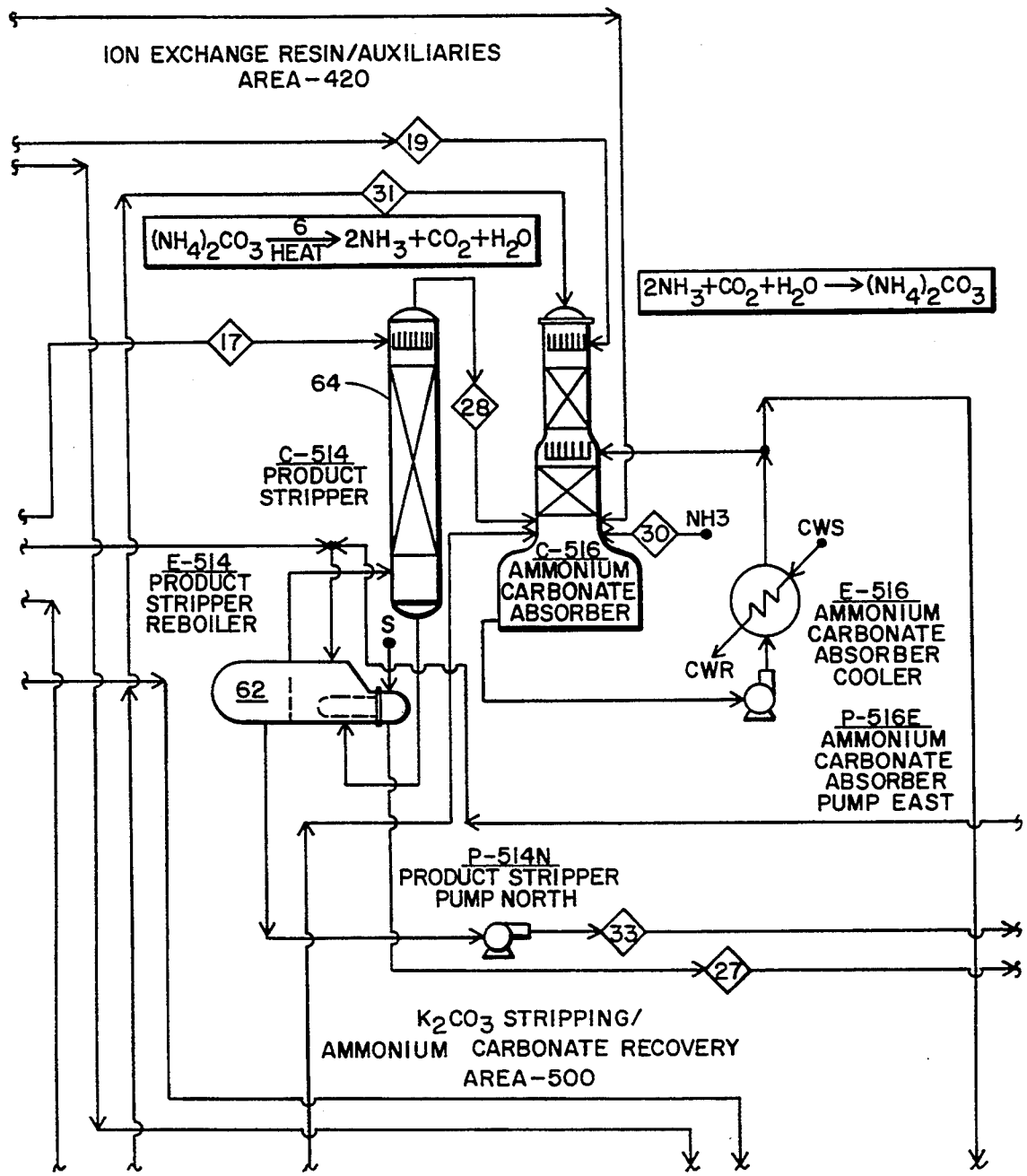
Figure 5H:
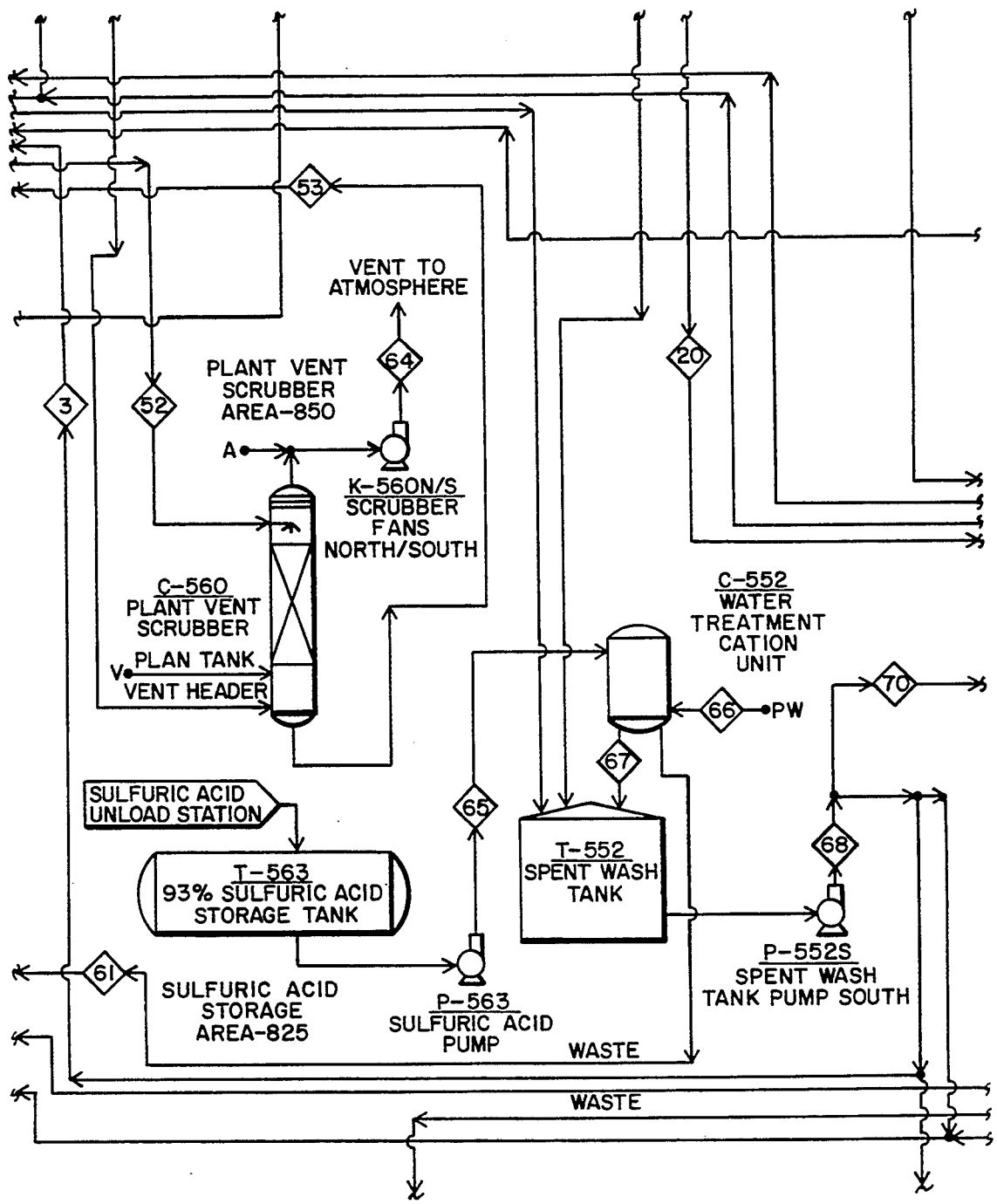
Figure 5I:
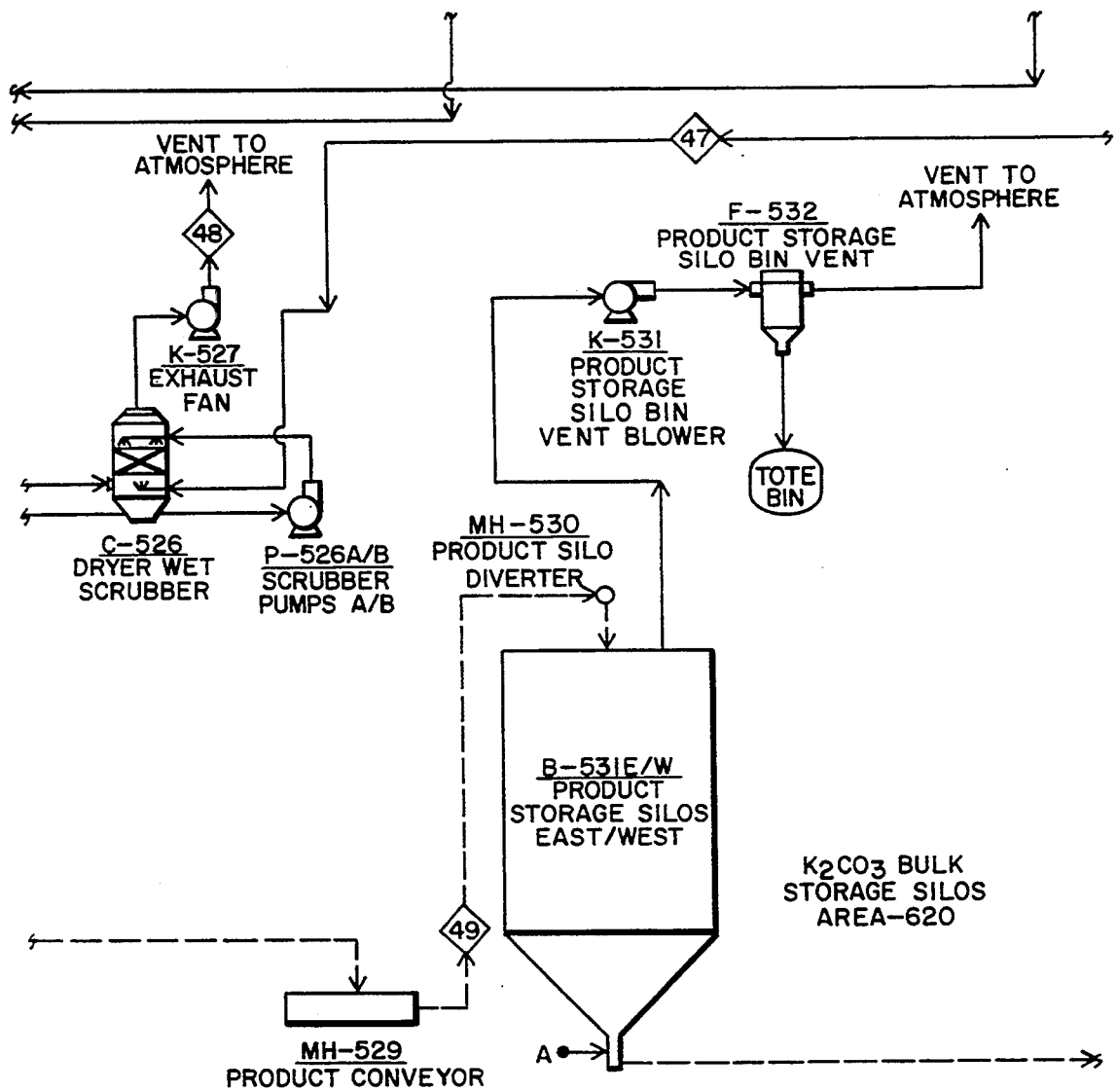
Figure 5J:
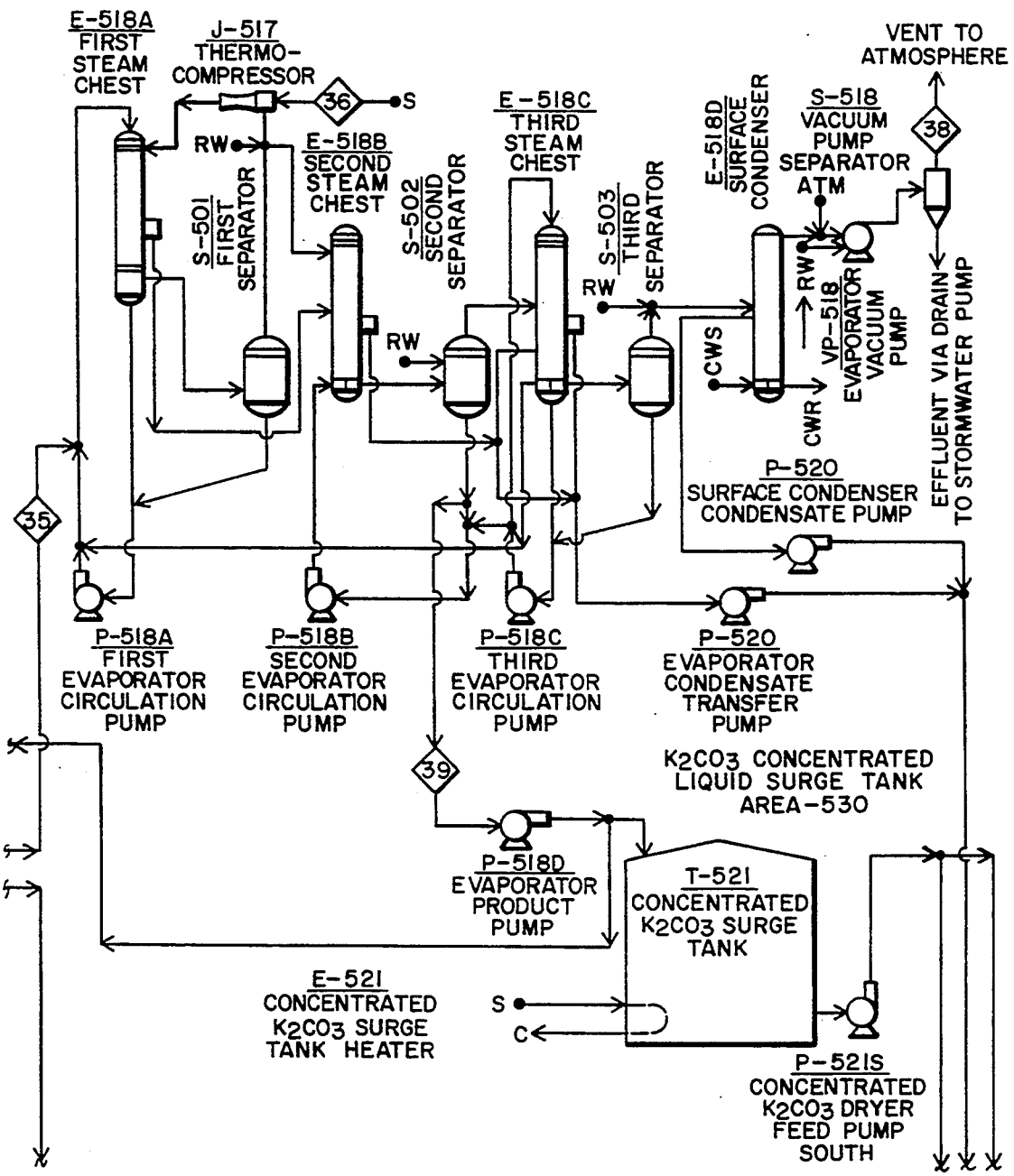
Figure 5K:
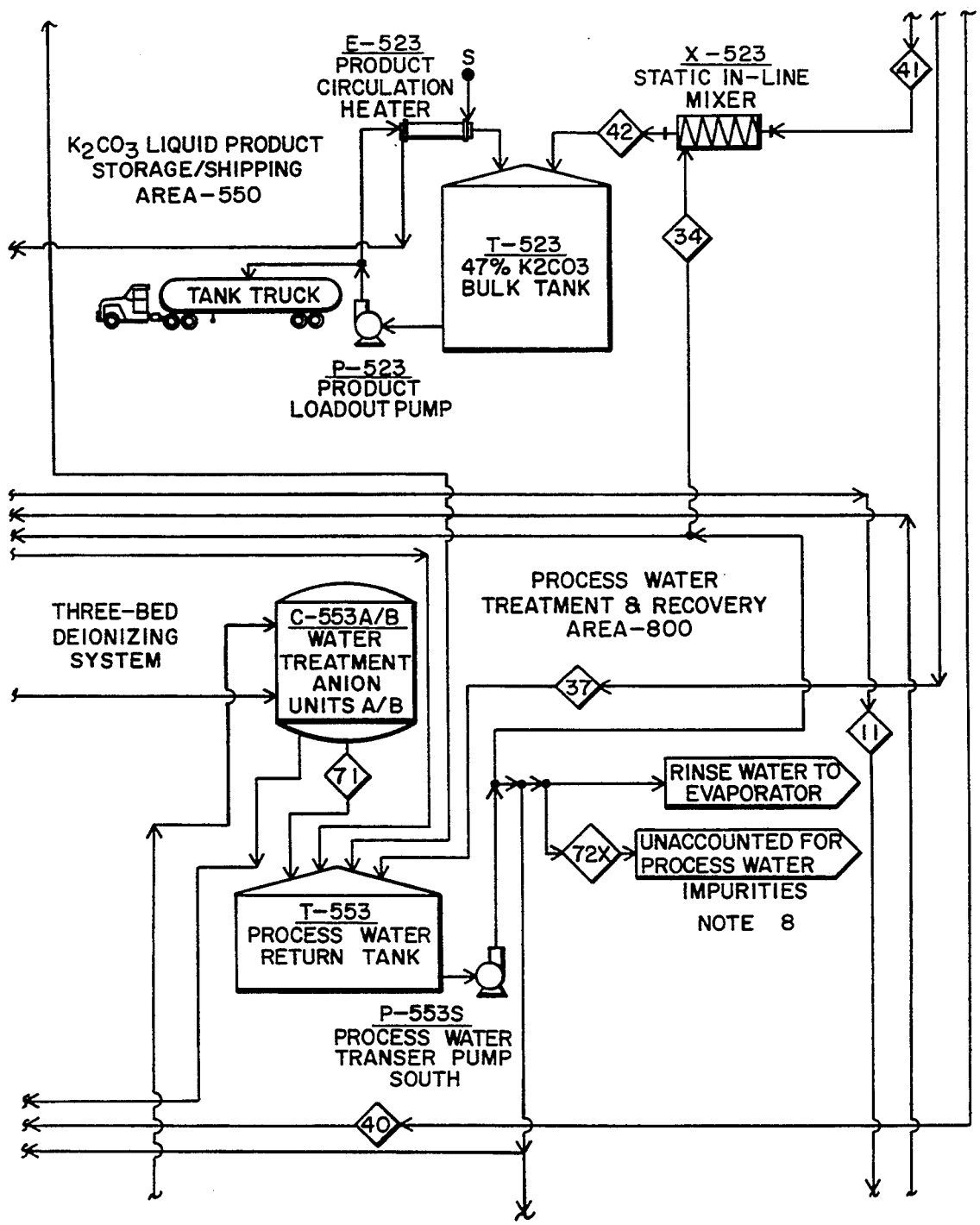
Figure 5L:
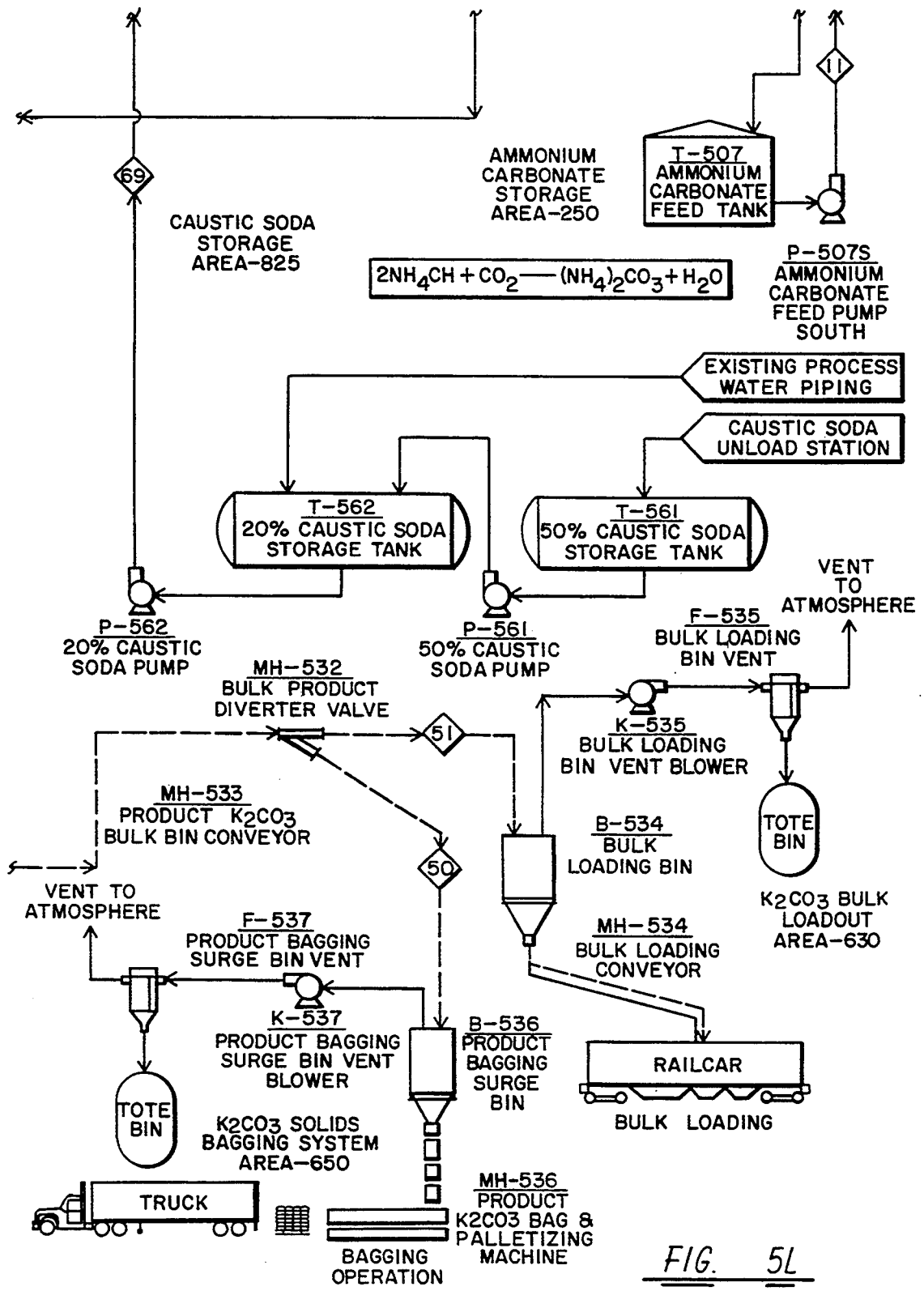

In the inventive process, the potassium carbonate solution is produced in a unique ion exchange approach. Referring to FIG. 5G, the initial material made is a weak $K_2CO_3$ solution which contains an excess of ammonium carbonate (stream 17) from the ion exchange reaction. This ammonium carbonate must be removed from the solution at some point in the process in order to recover the ammonia, and avoid contamination in the final $K_2CO_3$ product.

It has been found that the ammonium carbonate can be readily steam stripped from the solution in a straightforward, countercurrent column system. The inventive approach uses a packed column design containing a reboiler 62 in the bottom of the column 64. Stripped solution is heated in the column bottom to form the stripping steam. This steam passes up through the column to remove ammonium carbonate from the incoming solution. The overheads exiting the column (stream 28) are scrubbed and condensed (Step 66) in a solution which is ultimately recycled to the ion exchange system.

By incorporating the stripping step into the process, the resulting weak potassium carbonate solution is freed of ammonia carbonate in a straightforward manner. This weak solution can then be fed to a conventional, multiple-effect evaporator system to concentrate the $K_2CO_3$ to the desired concentration. Use of the multiple effect approach allows for maximum utilization of the steam and minimizes overall energy consumption for the process. This has distinct economic advantages compared to a system which did not strip the excess ammonium carbonate.

If the ammonium is not removed from the weak solution, prior to evaporation, the ammonium fraction will evolve during the evaporation step and end up in the evaporator overhead condensate. This results in the contamination of the condensate with ammonia and increases the complexity of the resulting solution handling circuits.

EXAMPLE A—BASE CASE PROCESS

The following table details the quantities and effluents being passed through the process shown in FIG. 1 and described above. This table has been based on the results of laboratory and pilot plant test work carried out on the overall base case process over an approximate 1½ year period.

| STREAM: | 101 KCl FEED | 103 DIL'N H2O | 104 KCl SOL'N | 151 CaCO3 FEED | 153 KILN FUEL | 414 SLAKING WATER | 212 NH4Cl SOL'N | 211 REGEN WASH | 220 RCYC'D A/CARB | 223 K2CO3 SOL'N | 221 PRODUCT WASH |
|---|---|---|---|---|---|---|---|---|---|---|---|
| FLOW (TOTAL): | | | | | | | | | | | |
| STPY | 30,139 | 97,762 | 127,901 | 19,399 | | 47,921 | 193,816 | 371,355 | 151,799 | 220,100 | 195,723 |
| LBS/HR | 7,849 | 25,459 | 33,308 | 5,052 | | 12,479 | 50,473 | 96,707 | 39,531 | 57,318 | 50,970 |
| GPM | | | 57 | | | 24 | 98 | 193 | 71 | 102 | 102 |
| MM BTU/HR | | | | | 6.9 | | | | | | |
| SPECIES (LBS/HR): | | | | | | | | | | | |
| K | 4,093 | | 4,093 | | | | 409 | | | 3,684 | |
| Ca | | | | 1,983 | | | | | | | |
| NH3 | | | | | | | 1,605 | | 2,867 | 1,263 | |
| CO2 | | | | 2,177 | | | | | 3,778 | 3,705 | |
| CL | 3,716 | | 3,716 | | | | 3,716 | | | | |
| H2O | 39 | 25,459 | 25,498 | | | 10,995 | 44,648 | 96,707 | 31,443 | 47,246 | 50,970 |
| SP GRAVITY | | | 1.16 | | | | 1.03 | 1.00 | 1.12 | 1.12 | 1.00 |
| % MOISTURE | 0.5% | | | 0% | | | | | | | |

| STREAM: | 302 STN TD A/C STRP | 305 A/C SCB PRODUCT | 308 K/C EVP D/HD'S | 309 STN TD K/C EVP | 310 EVAP COND | K/C DRYER FEED | DRYER FUEL | K2CO3 PROD | STN TD NH3 STRP |
|---|---|---|---|---|---|---|---|---|---|
| FLOW (TOTAL): | | | | | | | | | |
| STPY | 37,500 | 33,035 | 164,751 | 49,425 | 214,176 | 41,684 | | 25,126 | 33,897 |
| LBS/HR | 9,766 | 13,011 | 42,904 | 12,071 | 55,775 | 10,855 | | 6,543 | 8,827 |
| GPM | | 23 | | | 112 | | | | |
| MM BTU/HR | | | | | | | 6.00 | | |
| SPECIES (LBS/HR): | | | | | | | | | |
| K | | 94 | | | | 3,684 | | 3,684 | |
| Ca | | | | | | | | | |
| NH3 | | 1,272 | 0 | | | | | | |
| CO2 | | 1,696 | 0 | | | 2,074 | | 2,073 | |
| Cl | | | | | | | | | |
| H2O | 9,766 | 10,725 | 42,904 | 12,871 | 55,775 | 4,342 | | 33 | 8,827 |
| SP GRAVITY | | 1.10 | | | 1.00 | 1.50 | | | |

-continued

| | STREAM: | NH3 SCRD PRODUCT | CaCl2 EFFLUENT | 501 COOLING H2O | 511 PROCESS M/UP H2O | 522 CO2 MAKE UP | 523 NH3 MAKE UP |
|---|---|---|---|---|---|---|---|
| % MOISTURE | | | | | 40% | 0.5% | |
| FLOW (TOTAL): | | | | | | | |
| STPY | | 150,055 | 185,956 | 4,349,616 | 95,402 | 0 | 26 |
| LBS/HR | | 39,077 | 48,426 | 1,132,713 | 24,844 | 0 | 7 |
| GPM | | 80 | | | | | |
| MM BTU/HR | | | | 2,266 | 50 | | |
| SPECIES (LBS/HR): | | | | | | | |
| K | | | 409 | | | | |
| Ca | | | 1,963 | | | | |
| NH3 | | 1,667 | | | | | |
| CO2 | | | | | | | |
| Cl | | | 3,716 | | | | |
| H2O | | 37,227 | 42,240 | | | | |
| SP GRAVITY | | 0.98 | | | | | |
| % MOISTURE | | | 87% | | | | |

EXAMPLE B—(OPTION 1)

A solution of potassium carbonate from the Step 16 containing 18%/weight $K_2CO_3$ and about 3% to 4%/wt $(NH_4)_2CO_3$ is mixed with ethyl alcohol, such that the resulting liquid phase contains a mixture of water and alcohol in a 1 to 1 weight ratio. Crystals of $K_2CO_3$ are precipitated and filtered from the liquid.

About 50 to 60% of the potassium carbonate can be recovered at this alcohol/water ratio. As the ratio of alcohol to water is increased, the amount of potassium carbonate rejected is also increased. It has also been observed that the effluent from Step 16 which is devoid of $(NH_4)_2CO_3$, by for example steam stripping, rather than rejection of the potassium carbonate as crystals, form a concentrated, water-rich, lower phase containing most of the $K_2CO_3$ which separates from the alcohol/water mixture. The amount of water in this layer is lower than the amount of water in the original potassium carbonate solution, thus a concentration effect is achieved. As an example, a solution of 18% $K_2CO_3$ when mixed with ethyl alcohol, at a 1/1 water/alcohol ratio, separates into an upper layer containing alcohol and water, and a lower layer containing in excess of 25% $K_2CO_3$; thus a potassium carbonate concentration is effected by virtue of the solvent rejection of the salt to the water phase.

EXAMPLE C—(OPTION 2)

A solution of potassium bicarbonate containing 28% to 29% by weight $KHCO_3$ is mixed with dry KCl. The amount of KCl added is sufficient to form a solution containing about 24% KCl/wt. The resulting slurry is filtered to remove the salted out $KHCO_3$, then the strong KCl solution recycled in Step 16. About 50% of the contained $KHCO_3$ is precipitated from the solution.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method for producing potassium carbonate from potassium chloride and ammonium carbonate via a continuous countercurrent ion exchange process comprising the steps of:

feeding saturated potassium chloride (KCl) solution to a regeneration zone of a continuous ion exchange system wherein the KCl solution is passed through an ammonium ($NH_4^+$) resin bed in a countercurrent fashion and converts the $NH_4^+$ resin to a potassium form in solution according to the reaction:

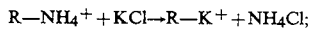
$$R-NH_4^+ + KCl \rightarrow R-K^+ + NH_4Cl;$$

and discharging the $NH_4Cl$ solution from the exchanger, transferring the regenerated resin into a washing zone to remove entrained chloride; moving the washed resin into a production zone and contacting the resin with an incoming ammonium carbonate solution to convert the resin back to the ammonium form according to the following reaction:

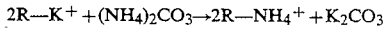
$$2R-K^+ + (NH_4)_2CO_3 \rightarrow 2R-NH_4^+ + K_2CO_3$$

whereupon the $K_2CO_3$ solution is discharged from the exchanger.

2. The method as recited in claim 1, further comprising the step of countercurrent steam stripping of the potassium carbonate solution exiting the continuous ion exchange system to remove and recover the ammonium carbonate in said solution as $NH_3$ and $CO_2$ fractions for recycle, to an ammonium carbonate absorber.

3. The method of claim 2 wherein the step of steam stripping includes the further steps of:

flowing the $K_2CO_3$ solution in a countercurrent direction through a packed column steam stripper;

boiling the $K_2CO_3$ solution falling through the column to generate a rising column of steam of the solution wherein a vapor form of $2NH_3 + CO_2 + H_2O$ is recovered from the top of the column.

4. The method as recited in claim 1 further comprising the recovery of ammonia and calcium chloride from the process, and based on the following steps:

adding lime $Ca(OH)_2$ to the discharged $NH_4Cl$ in a stirred reactor to accomplish the reaction:

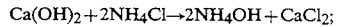
$$Ca(OH)_2 + 2NH_4Cl \rightarrow 2NH_4OH + CaCl_2;$$

and steam stripping the $NH_4OH$ from the resulting ammonium hydroxide/calcium chloride solution to yield a $CaCl_2$ solution which can be used for further processing, with the stripped $NH_3+H_2O$ recycled back to an absorber in the process to form $(NH_4)_2CO_3$ for use in the ion exchanger.

5. The method as recited in claim 4, further comprising the recovery of ammonium carbonate in the process and based on the following steps:

injecting $CO_2$ into the stripped $NH_3+H_2O$ in an absorber to form $(NH_4)_2CO_3$;

collecting stripped $NH_3+CO_2$ from the $K_2CO_3$ solution in the same absorber to form $(NH_4)_2CO_3$; and injecting the ammonia carbonate from the absorber into the continuous ion exchanger.

6. The method as recited in claim 5, further comprising the steps of:

combining the discharged $K_2CO_3$ solution with concentrated ethanol solution to reject the $K_2CO_3$ from solution and form $K_2CO_3$ crystals;

filtering the $K_2CO_3$ crystals from the combined ethanol and $K_2CO_3$ solution;

recovering concentrated alcohol from the combined solution after filtering the $K_2CO_3$ crystals; and reinjecting the recovered alcohol into the discharged $K_2CO_3$ solution.

7. The method as recited in claim 6 further comprising the steps of:

partially evaporating the recovered $K_2CO_3$ solution;

injecting $CO_2$ gas in the partially evaporated $K_2CO_3$ to form $KHCO_3$, and adding solid potassium chloride to precipitate $KHCO_3$ and form a concentrated KCl solution;

filtering the precipitated $KHCO_3$ from the concentrated KCl solution; and injecting the concentrated KCl filtrate solution into the continuous countercurrent ion exchanger.

8. The method of claim 1 and including the further steps of:

forming a concentrated $K_2CO_3$ of the recovered $K_2CO_3$ solution at an elevated temperature;

feeding the concentrated $K_2CO_3$ solution into a fluid bed reactor operating at a temperature of at least 300° F. to produce anhydrous, dense, spherical $K_2CO_3$ granules; and collecting the dried $K_2CO_3$ granules from the bed.

9. The method of claim 8 wherein the step of forming a concentrated $K_2CO_3$ solution comprises the steps of multiple effect evaporation of a weak $K_2CO_3$ solution.

* * * * *